July 2, 1963 F. F. STUCKI 3,096,449

TUNNEL DIODE SWITCHED TO LOW-STATE BY DISCHARGING CAPACITOR, PULSE SENSING DEVICE CHARGED BY COINCIDENTLY APPLIED HIGH-STATE PRODUCING INPUTS

Filed June 23, 1961 3 Sheets-Sheet 1

INVENTOR.
FRANK F. STUCKI
BY George C. Sullivan
Agent

July 2, 1963 F. F. STUCKI 3,096,449

TUNNEL DIODE SWITCHED TO LOW-STATE BY DISCHARGING CAPACITOR, PULSE SENSING DEVICE CHARGED BY COINCIDENTLY APPLIED HIGH-STATE PRODUCING INPUTS

Filed June 23, 1961 3 Sheets-Sheet 2

INVENTOR.

FRANK F. STUCKI

BY George Sullivan

Agent

July 2, 1963 F. F. STUCKI 3,096,449

TUNNEL DIODE SWITCHED TO LOW-STATE BY DISCHARGING CAPACITOR, PULSE SENSING DEVICE CHARGED BY COINCIDENTLY APPLIED HIGH-STATE PRODUCING INPUTS

Filed June 23, 1961 3 Sheets-Sheet 3

INVENTOR.
FRANK F. STUCKI
BY George Sullivan
Agent 3,096,449
Patented July 2, 1963

3,096,449

TUNNEL DIODE SWITCHED TO LOW-STATE BY DISCHARGING CAPACITOR, PULSE SENSING DEVICE CHARGED BY COINCIDENTLY APPLIED HIGH-STATE PRODUCING INPUTS

Frank F. Stucki, Palo Alto, Calif., assignor to Lockheed Aircraft Corporation, Burbank, Calif.

Filed June 23, 1961, Ser. No. 119,164
2 Claims. (Cl. 307—88.5)

This invention relates to an amplifier and more particularly to an amplifier utilizing the characteristics of a tunnel diode.

The art of digital computers and the associated logical circuits is rapidly advancing and considerable effort is being made to increase the speed of digital computer operations. With increased speed of operations, one of the primary problems is that the magnitude and time duration of current pulses which contain the logical information becomes progressively smaller. Therefore, in order to obtain usable information from the computer memory, for example, it is necessary to amplify and extend the time duration of the current pulses which are gated from the computer memory. Since the gated current pulses frequently have an amplitude of less than a milliampere and a time duration of less than two microseconds, it is necessary to employ an amplifier which is responsive to small current pulses, has a high frequency response and is capable of extending the time duration of the amplified pulses. In addition, in digital computer operations it is frequently necessary to convert the positive and negative current pulses from the computer memory into amplified positive going pulses.

The present invention utilizes tunnel diodes which have the characteristics of extremely high frequency operation, low noise, low operating power levels and small size. In one embodiment, amplification and extension of the amplified pulse time duration are accomplished by a unique technique for switching the tunnel diode which utilizes the leading edge of the memory output pulse and the trailing edge of a synchronous strobe pulse. The strobe pulse functions both as a D.C. bias and a mechanism by which the reverse tunneling is effectuated. The D.C. bias characteristic of the strobe pulse has two primary functions. The first function is to provide a reference level to which the current pulse created by the leading edge of the memory output pulse is added which results in forward tunneling along the load line of the tunnel diode to a high impedance state. The second function is to prevent the current pulse created by the trailing edge of the memory output pulse from causing reverse tunneling of the tunnel diode. The trailing edge of the strobe pulse occurs at a later time than the trailing edge of the current pulse created by the memory output pulse and effectuates reverse tunneling of the tunnel diode. The tunnel diode is used as a switching device for a transistor to which it is connected wherein the transistor is rendered conducting when the tunnel diode has a large forward bias and nonconducting when it has a small forward bias.

In another embodiment of the present invention a pair of tunnel diodes are used in conjunction with a transformer the secondary of which is center tapped. Strobe pulses are applied to each tunnel diode in the manner above described and one tunnel diode senses positive going memory output pulses and the other tunnel diode senses negative going memory output pulses.

In still another embodiment of the present invention the strobe pulse is synchronized with the memory current pulse wherein both have approximately the same time duration. The synchronized pulse is shortened in time duration so the tunnel diode has a greater probability of not being triggered by noise signals. The amplified time duration of the memory pulse is extended by use of a capacitor which is charged by the strobe pulse and exponentially discharges over a predetermined time to a voltage where reverse tunneling of the tunnel diode takes place.

Accordingly, an object of the present invention is to provide an amplifier which has a high frequency response, operates at low power levels and is relatively insensitive to noise.

Another object of the present invention is to provide a low impedance amplifier device which utilizes a tunnel diode for control of a transistor.

Still another object of the present invention is to provide an amplifier device that utilizes a tunnel diode which is operated in response to short and long current pulses.

A further object of the present invention is to provide an amplifier device which is responsive to small current pulses, has a high frequency response and is capable of extending the time duration of the incoming amplified pulses.

A still further object of the present invention is to provide a device which is capable of converting small positive and negative current pulses into amplified positive pulses of longer time duration.

The specific nature of the invention, as well as other objects, uses and advantages thereof, will clearly appear from the following description and from the accompanying drawing in which.

Like numerals designate like elements throughout the figures of the drawing.

Figure 1:
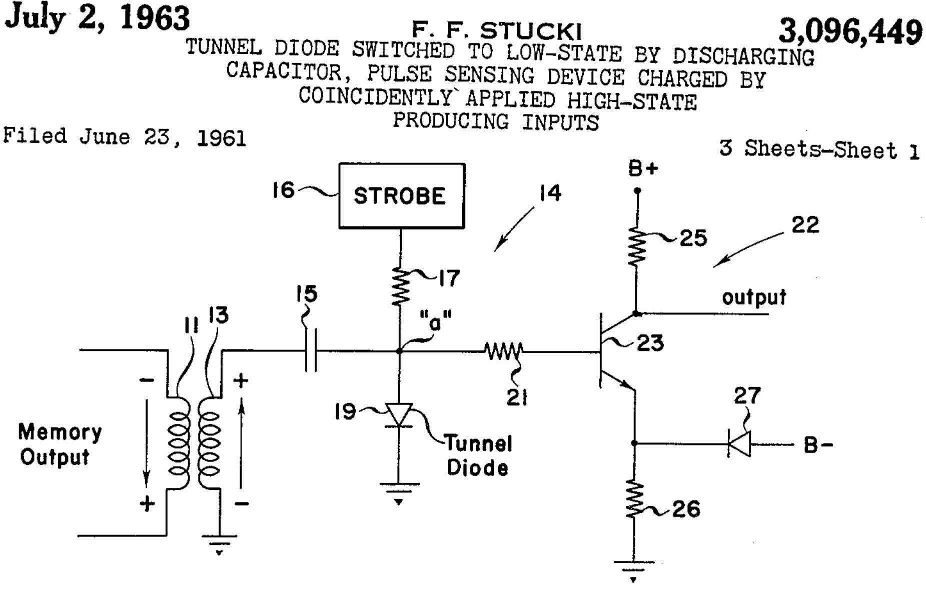
FIGURE 1 is a schematic illustration of one embodiment of the present invention.

In FIGURE 1 is shown an embodiment of the present invention which is employed to amplify and extend the time duration of small unidirectional pulses. As illustrated, the current pulses from the memory output are applied to primary winding 11. One side of secondary winding 13 is connected to ground and the other side is connected to the trigger circuit generally denoted by numeral 14. The trigger circuit includes D.C. blocking capacitor 15, strobe 16, resistor 17, tunnel diode 19 and resistor 21. D.C. blocking capacitor 15 is disposed between secondary 13 and junction "*a*." The output of strobe 16, the pulse timing function of which will be hereinafter described, is connected through resistor 17 to junction "*a*." Tunnel diode 19 is connected between ground and junction "*a*" and resistor 21 is connected between junction "*a*" and the amplifier circuit generally denoted by numeral 22. The amplifier circuit includes transistor 23, resistors 25 and 26, diode 27 and power for operation thereof. The collector of transistor 23 is connected through load resistor 25 to B+ power and the emitter is connected through resistor 26 to ground. In order that transistor 23 have more positive switching action, the emitter is connected through diode 27 to a negative source denoted as B−.

Figure 2:
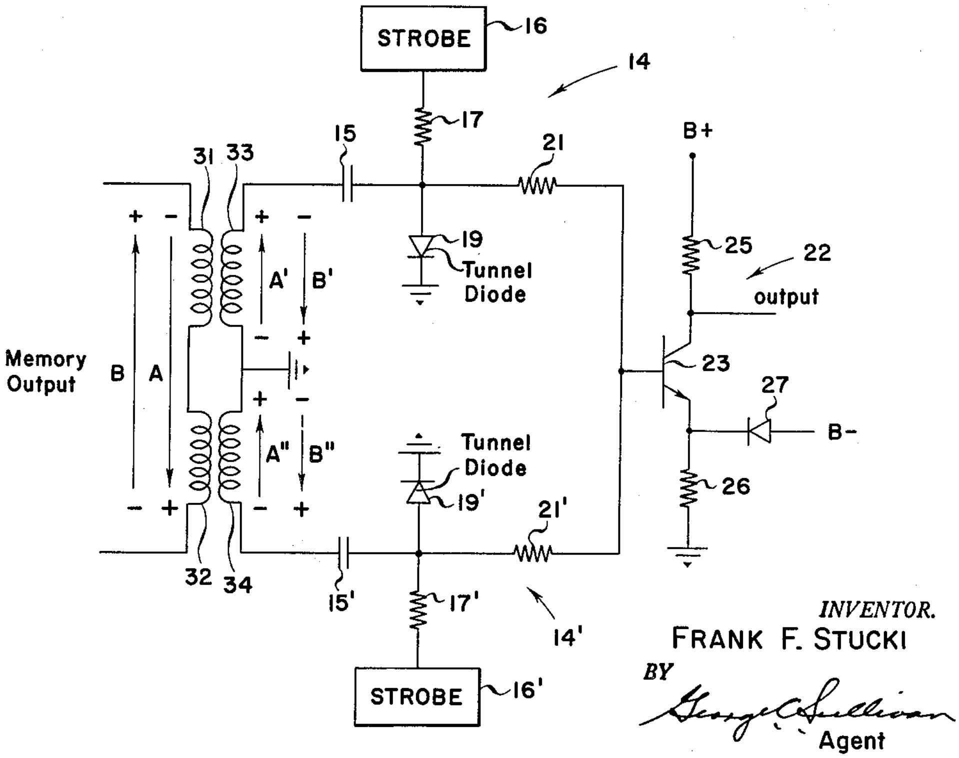
FIGURE 2 is a schematic illustration of another embodiment of the present invention.

In FIGURE 2 is shown another embodiment of the present invention which is employed to amplify and extend the time duration of small bidirectional pulses. In this embodiment the current pulses from the memory output are connected in series with primary windings 31 and 32 which are respectively coupled with center tapped secondary windings 33 and 34. The outputs of secondary windings 33 and 34 are respectively connected to trigger circuits generally denoted by reference numerals 14 and 14'. The outputs of trigger circuits 14 and 14' are connected to the base of transistor 23 of amplifier circuit 22. Trigger circuits 14 and 14' of the FIGURE 2 embodiment are illustrated as being identical to trigger circuit 14 of the FIGURE 1 embodiment. In addition, amplifier circuits 22 of these embodiments are illustrated as being identical. It is to be understood that these trigger and amplifier circuits need not be identical so long as the hereinafter described operations and functions are realized.

Figure 3:
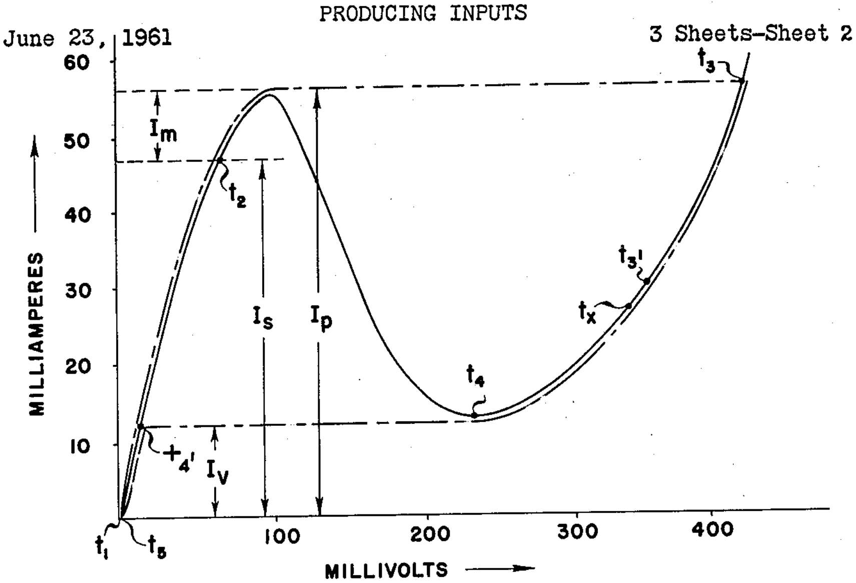
FIGURE 3 is a diagram illustrating the operating characteristics of the tunnel diodes of the embodiments shown in FIGURES 1 and 2.

Typical operation of the embodiments of the present invention as depicted in FIGURES 1 and 2 will now be described making use of the diagrams shown in FIGURES 3 and 4. The static characteristic curve for a typical tunnel diode is shown by the solid line of FIGURE 3. From this figure it can be seen the tunnel diode provides a low A.C. resistance for low values of forward voltage, a negative conductance characteristic for intermediate values of forward voltage and a positive conductance characteristics for higher values of forward voltage. Briefly, as the forward bias on the tunnel diode is progressively increased from zero to slightly less than $I_p$, the voltage across the tunnel diode will progressively increase along the solid line to about 90 millivolts. When the bias is increased to $I_p$, forward tunneling takes place along the broken line to point $t_3$ and will follow along the characteristic curves to point $t_{3'}$, the exact position of which is determined by the load being drawn. At points $t_3$ and $t_3'$ the voltage across the diode will be greater than 300 millivolts. As the current is decreased, the voltage across the diode will correspondingly decrease along the characteristic curve and when decreased to $I_v$, reverse tunneling occurs along the broken line wherein the voltage across the tunnel diode becomes only a few millivolts.

Figure 4:
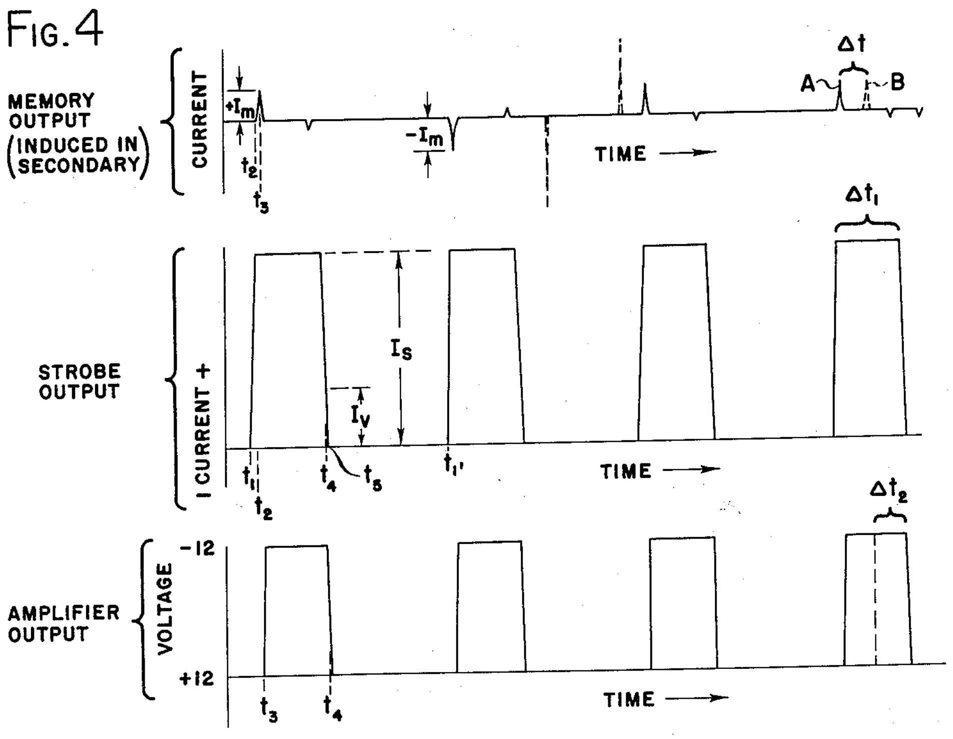
FIGURE 4 is a diagram which is to be taken in conjunction with the diagram shown in FIGURE 3 and illustrates the operation of the embodiments shown in FIGURES 1 and 2.

In FIGURE 4 are shown the secondary windings output current pulses ($+I_m$, $-I_m$) which are induced therein by the memory output pulses, the strobe output current pulses ($I_s$) and the corresponding amplifier output voltage pulses. The illustrated secondary output pulses are typical for square loop ferromagnetic material wherein the first pulse is shown as positive and having a magnitude of $+I_m$ and occurs as the core driver pulse drives the core from a first to a second state of flux saturation. The small negative going pulse is due to shuttling in the second state of saturation when the core driver pulse is removed. The second pulse is shown as negative and having a magnitude of $-I_m$ and the remaining pulses are shown as positive. It should be noted that the memory output current pulses correspond with the current pulses induced in the secondary winding as illustrated by the solid arrows and corresponding polarity indicia in FIGURES 1 and 2. As illustrated in FIGURE 4, the current pulses from the strobe outputs are always positive and synchronous with the memory output pulses. It should be particularly noted that it is mandatory the peak magnitude ($I_s$) of the strobe pulses occur prior to or simultaneous with the peak value ($I_m$) of the induced memory output pulse. The value of $I_s$ is selected to be less than $I_p$ and when summed with $I_m$ is equal to or greater than $I_p$.

Transistor 23 of the embodiment of FIGURES 1 and 2 is provided with resistors 26 and diodes 27 which are connected to negative D.C. sources. When transistor 23 is nonconducting, the emitter is at ground potential; however, when the transistor starts conducting, the emitter becomes slightly positive which allows diode 27 to break down and a negative voltage (B−) is applied to the emitter which provides a faster and more pronounced transistor switching action.

Since only positive current pulses, which are induced in the secondary winding by the memory current pulses, increase the current through the tunnel diode to a value equal to or greater than the current $I_p$, when summed with $I_s$, the FIGURE 1 embodiment will trigger the amplifier circuit only when there are memory current pulses having one polarity. Therefore, the FIGURE 1 embodiment is to be used with memory output pulses having one polarity or when it is desired to sense only output pulses having one polarity.

The operation of the FIGURE 1 embodiment is to be considered in conjunction with FIGURES 3 and 4 and is as follows: At time $t_1$ the strobe pulse is initially applied and the current through the tunnel diode is zero and corresponds with point $t_1$ on the characteristic curve of FIGURE 3. At time $t_2$, the strobe pulse reaches maximum value and the tunnel diode has an operating point corresponding with point $t_2$ of FIGURE 3. As previously explained, the trigger voltage of transistor 23 is about 200 millivolts and since the tunnel diode at time $t_2$ has a differential potential of about 70 millivolts, transistor 23 is not triggered and therefore remains nonconducting. The current pulse ($+I_m$) induced in the secondary winding by the memory output pulse initially starts at time $t_2$ and reaches maximum value at time $t_3$. During this time duration, the operating point shifts along the characteristic curve and forward tunneling takes place (as denoted by the broken line) when $I_s+I_m=I_p$ wherein the operating point shifts to point $t_3$ on the characteristic curve. It can be seen the voltage across the tunnel diode at point $t_3$ is about 400 millivolts which triggers transistor 23 and renders it conducting. Therefore, at time $t_3$ of FIGURE 4, the voltage output from amplifier circuit 22 starts charging to a maximum value. While the transistor is conducting, current is drawn by the base which shifts the tunnel diode to an operating point approximately corresponding with point $t_{3'}$ which may be shifted by appropriate selection of the values of resistors 21 and 26 or the base-emitter resistance of transistor 23. Transistor 23 will remain conducting as long as the operating point of the tunnel diode has a voltage greater than the trigger voltage (for example, 200 millivolts) of the transistor.

A primary feature of the present invention is that transistor 23 will remain conducting irrespective of shuttle pulses which occur at a predetermined time following each transfer pulse ($I_m$). This insensitive characteristic to shuttle pulses is made possible by judicious selection of the strobe pulse, base current when the transistor is conducting and tunnel diode characteristics. That is, these factors are selected so that steady state operation takes place at an operating point (for example, $t_3'$) on the characteristic curve wherein negative shuttle pulses will not decrease the current through the tunnel diode to a value equal to or less than the valley current $I_v$. To illustrate, it can be seen the negative shuttle pulse will subtract from the current already passing through the tunnel diode from the strobe current pulse and will shift operation from operating point $t_{3'}$ along the characteristic curve to an operating point (for example, $t_x$) having a characteristic voltage greater than the transistor trigger voltage and a characteristic current greater than $I_v$. Upon cessation of the negative shuttle current pulse there will be return to operating point $t_{3'}$. Therefore, shuttle pulses will not cause reverse tunneling at an improper time and the transistor will remain conducting until there is removal of the strobe pulse.

Transistor 23 will become nonconducting when the voltage across the tunnel diode becomes less than the trigger voltage of the transistor. This occurs at the trailing edge of the strobe pulse when the current value decreases to $I_v$ at time $t_4$ wherein there is reverse tunneling to point $t_{4'}$, and then return to zero current and voltage at time $t_5$. From time $t_5$ to time $t_{1'}$ there is no voltage or current on the tunnel diode and transistor 23 will remain nonconducting.

It should be particularly noted that inhibit and reset of the computer memory occur when there are no strobe pulses. It is inherent in digital computer operations that noise occurs during this period which is primarily due to the inhibit and reset operations and little, if any, noise occurs during the period of the strobe pulse. In FIGURE 4, negative and positive noise current pulses are shown in dotted lines. The negative noise pulse will obviously not trigger the tunnel diode. However, to prevent triggering by the positive noise pulse, the peak current ($I_p$) of the tunnel diode is selected to have a value greater than noise current pulses which may be encountered.

In view of the foregoing it can be seen that operation of the circuit shown in FIGURE 1 in conjunction with a digital computer provides an amplifier which is insensitive to computer noise as well as shuttle pulses and provides an amplified output voltage having an extended time duration.

The operation of the FIGURE 2 embodiment is similar to the FIGURE 1 embodiment; however, it differs in that a technique is provided wherein the amplifier is actuated in response to bipolar memory current pulses. From FIGURE 2 it can be seen secondary windings 33 and 34 are center tapped to ground and therefore when a current pulse is applied to primary windings 31 and 32 in the direction and assumed polarity shown by the arrow denoted as A, that current pulses will appear in secondary windings in the direction and polarity shown by the arrows denoted by A′ and A″. Therefore, with a current pulse in the direction denoted by arrow A, a positive current pulse A′ ($+I_m$) will be added to the positive current pulse ($I_s$) from strobe 16 and the negative current pulse A″ ($-I_m$) will be added to the positive current pulse ($+I_s$) from strobe 16′. From FIGURE 3 it can be seen that forward tunneling of tunnel diode 19 will result and transistor 23 will be rendered conducting; however, tunnel diode 19′ will not exhibit forward tunneling since the current passing therethrough is less than $I_p$. When a current pulse is applied to primary windings 31 and 32 in the direction shown by the arrow denoted as B, current pulses will appear in secondary windings in the direction and polarity shown by the arrows denoted as B′ and B″. The positive current pulse B″ ($+I_m$) will be added to the positve current pulse ($+I_s$) from strobe 16′ and the negative current pulse B′ ($-I_m$) will be added to the positive current pulse ($+I_s$) from strobe 16. Therefore forward tunneling of tunnel diode 19′ will result and transistor 23 will be rendered conducting. Tunnel diode 19 will not exhibit forward tunneling since the current passing therethrough is less than $I_p$.

In view of the foregoing it can be seen that transistor 23 of the FIGURE 2 embodiment will be rendered conducting during each strobe pulse provided either a negative or positive memory output pulse is applied to the primary winding in synchronism therewith. Two strobes 16 and 16′ are illustrated in FIGURE 2; however, it is to be understood that a single strobe may be readily employed, for example, by connecting the output therefrom in parallel or series with resistors 17 and 17′.

The embodiments shown in FIGURES 1 and 2 have particular applicability in computers where there may be considerable delay in the occurrence of the output pulses from the computer memory which may be the case where the memory storage is large. The time at which the maximum amplitude of the strobe pulse initially occurs is selected to be simultaneous with or slightly before the shortest possible delay of any output pulse from the computer memory. The strobe pulse is selected to have a sufficiently long duration so it will be in existence at the occurrence of a memory pulse having the longest possible delay. In FIGURE 4, pulse A represents the pulse having the shortest possible time delay and pulse B represents the pulse having the longest possible time delay wherein the time interval Δ+ represents the maximum possible time delay. The strobe pulse is selected to have a time duration $\Delta t_1$ which is greater than $\Delta t$ such that the time duration $\Delta t_2$ of the amplified output pulse will provide an adequate extension of the time duration of the memory pulse.

While it is to be understood that the circuit parameters of the present invention may vary according to the design or application, the following circuit parameters are included by way of example:

| | |
|---|---|
| Supply voltages: | Volts |
| B+ | +12 |
| B− | −12 |
| Strobe (**16** and **16′**) | 0 to +12 |
| Transistor: | |
| **23** | Silicon NPN. |
| Resistors: | Ohms |
| **17** | 12,000 |
| **21** | 220 |
| **25** | 2,200 |
| **26** | 4,400 |
| Capacitor: | |
| **15** | 100 micromicrofarads. |

The time duration of the strobe pulse was selected to be 2.5 microseconds for memory pulses of about .5 microsecond duration.

Figure 5:
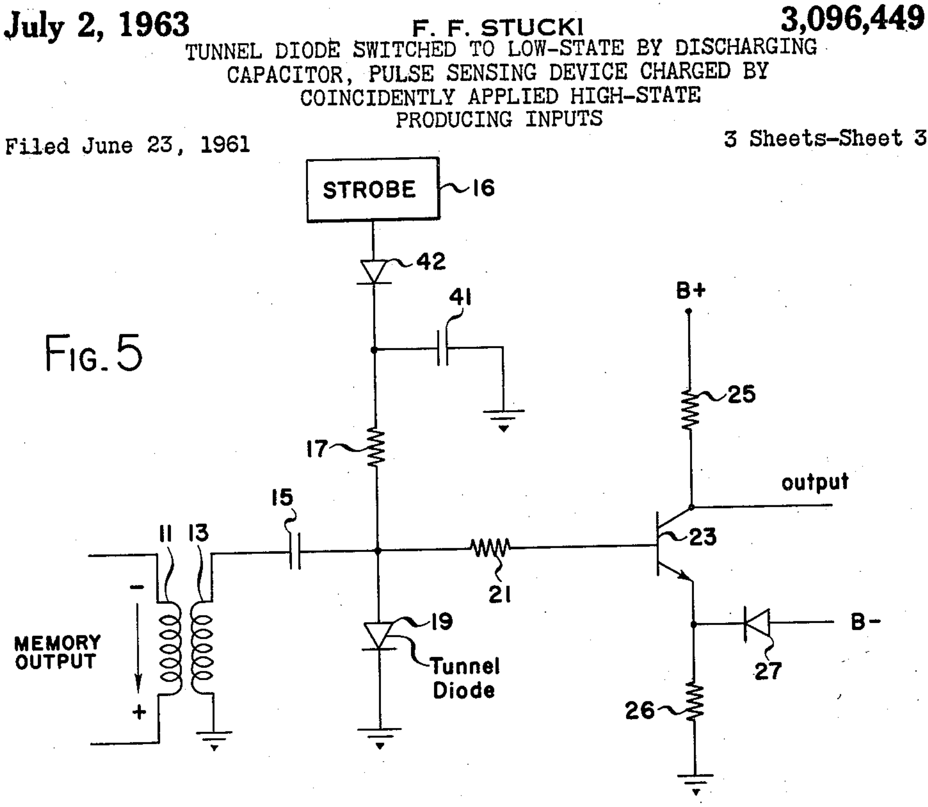
FIGURE 5 is a schematic illustration of a modification of the device shown in FIGURE 1.

In FIGURE 5 is shown still another embodiment of the present invention which has particular application where there is little or no delay of output current pulses from the computer memory. This condition prevails, for example, where the memory storage is small and few cores are employed. While the bulk of noise will occur during that period when there is no strobe pulse, it is nevertheless highly desirable to minimize the probability of noise triggering the tunnel diode during that period when the strobe pulse would normally occur. This embodiment is directed to minimizing this probability and differs from the previously described embodiments in that the time duration of the strobe pulse is much shorter and current is supplied to the tunnel diode by means of storage capacitor 41 which is connected to ground. Diode 42 may be provided so capacitor 41 will not discharge through strobe 16 to ground. This technique has the advantage of being highly noise insensitive since there is an exponential current decay after termination of the short strobe pulse. Therefore, there is considerable decrease in the probability of noise occurring at a time which, when added to the current passing through the tunnel diode, will trigger the tunnel diode.

Figure 6:
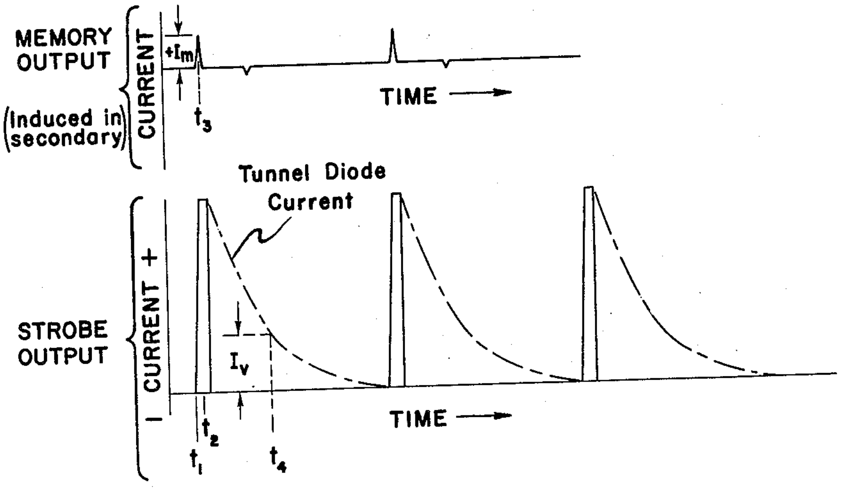
FIGURE 6 is a diagram illustrating the operation of the device shown in FIGURE 5.

In FIGURE 6 is illustrated the strobe and memory current pulses wherein the time duration of the strobe pulse is of the order of .8 microsecond and the memory pulse is about .5 microsecond. The exponential decay of the charge stored on capacitor 41 is shown in broken lines and the capacitor is selected so the current through the tunnel diode decreases to a value corresponding to $I_v$ at about 2.5 microseconds. Therefore, transistor 23 will remain conducting for about 2.5 microseconds after simultaneous application of the strobe and memory pulses. It will be particularly noted that if there is no memory pulse, the strobe pulse will charge capacitor 41 to about the strobe pulse potential and will set an initial operating point corresponding to about point $t_2$ on the tunnel diode characteristic curve of FIGURE 3. As the capacitor exponentially discharges through resistor 17 and the tunnel diode, the operating point will shift along the characteristic curve from point $t_2$ towards zero at a rate corresponding with the exponential decay of capacitor 41.

It is to be understood in connection with this invention that the embodiments shown are only exemplary, and that various modifications can be made in construction and arrangement within the scope of the invention as defined in the appended claims.

What is claimed is:

1. A trigger circuit comprising means for sensing a current pulse, means for applying the sensed current pulse to the collector of a tunnel diode, means for applying a second current pulse simultaneously with said sensed current pulse to the collector of said tunnel diode, the sum of said sensed current pulse and said second current pulse being greater than the peak current of said tunnel diode and resulting in switching said tunnel diode from the low voltage state to the high voltage state, a capacitive storage means operatively connected to said means for applying said second current pulse and to the collector of said tunnel diode, whereby said tunnel diode remains in said high voltage state until the charge on said capacitive storage means created by said second current pulse exponentially decays to a predetermined value at which time said tunnel diode switches to the low voltage state.

2. An amplifier circuit for amplifying and extending the time duration of unidirectional output current pulses from a memory circuit of a digital computer comprising means sensing the current pulses gated from said memory circuit, means for applying said sensed pulses to the collector of a tunnel diode, a source of current pulses applied to the collector of said tunnel diode, the current magnitude of each of the pulses from said source being about constant and greater than the valley current and less than the peak current of said tunnel diode, the magnitude of each of said sensed pulses being less than the peak current of said tunnel diode, the sum of any one of said pulses from said source and any one of the unidirectional sensed pulses being at least equal to the peak current of said tunnel diode, each of the sensed current pulses occurring during a current pulse from said source, a capacitive storage means operatively connected to said source and to the collector of said tunnel diode, whereby said tunnel diode is switched from the low voltage state to the high voltage state when a pulse from said source and said sensed pulse simultaneously occur and remains in said high voltage state until the charge on said capacitive storage means created by said sensed pulse exponentially decays to a predetermined value at which time said tunnel diode switches to the low voltage state, and an amplifying element responsive to the voltage state of said tunnel diode and providing an amplified signal only during that period of time when said tunnel diode is in the high voltage state.

References Cited in the file of this patent

UNITED STATES PATENTS 3,017,613 Miller ------------------- Jan. 16, 1962

OTHER REFERENCES

"RC Coupled Tunnel Diode Shift Register," IBM Technical Disclosure Bulletin, vol. 2, No. 6, April 1960.